(12) United States Patent
Lovberg et al.

(10) Patent No.: US 6,556,836 B2
(45) Date of Patent: Apr. 29, 2003

(54) POINT-TO-POINT, MILLIMETER WAVE, DUAL BAND FREE SPACE GIGABIT PER SECOND COMMUNICATION LINK

(75) Inventors: John Lovberg, San Diego, CA (US); Kenneth Y. Tang, Alpine, CA (US); Randall Olsen, Carlsbad, CA (US); Vladimir Kolinko, San Diego, CA (US)

(73) Assignee: Trex Enterprises Corporation, San Diego, CA (US)

( * ) Notice: Subject to any disclaimer, the term of this patent is extended or adjusted under 35 U.S.C. 154(b) by 0 days.

(21) Appl. No.: 09/847,629

(22) Filed: May 2, 2001

(65) Prior Publication Data

US 2002/0164957 A1 Nov. 7, 2002

(51) Int. Cl.$^7$ .............................. H04B 15/00; H04B 1/38
(52) U.S. Cl. ...................... 455/505; 455/562; 455/67.5; 455/445; 455/10; 455/25; 455/73; 343/894
(58) Field of Search .................. 455/505, 562, 455/67.5, 445, 10, 25, 73, 560, 504, 506, 561, 7, 8, 9, 16, 67.1; 343/894, 840, 720, 757, 760, 874; 375/211; 370/315

(56) References Cited

U.S. PATENT DOCUMENTS 5,701,591 A  * 12/1997  Wong .......................... 455/63
5,999,519 A  * 12/1999  Basile et al. ................. 370/310
6,006,070 A  * 12/1999  Wong .......................... 455/63
6,233,435 B1 *  5/2001  Wong .......................... 455/63
6,240,274 B1 *  5/2001  Izadpanah .................... 370/536

* cited by examiner

*Primary Examiner*—Lee Nguyen
*Assistant Examiner*—Rafael Perez-Gutierrez
(74) *Attorney, Agent, or Firm*—John R. Ross; John R. Ross, III (57) ABSTRACT

A point-to-point, wireless, millimeter wave communications link providing data transmission rates of over 1 billion bits per second (more than 1 Gbps) at ranges of several miles during normal weather conditions. In a preferred embodiment a communication link operates within the 92 to 95 GHz portion of the millimeter spectrum. A first transceiver transmits at a first bandwidth and receives at a second bandwidth both within the above spectral range. A second transceiver transmits at the second bandwidth and receives at the first bandwidth. The transceivers are equipped with antennas providing divergence of less than $10^{-4}$ steradians so that an almost unlimited number of transceivers can use the same spectrum. In a preferred embodiment the first and second spectral ranges are 92.3–93.2 GHz and 94.1–95.0 GHz. During very bad weather conditions this data link will not provide a $10^{-10}$ bit-error rate and 99.999% availability. Therefore, a second transceiver pair operating in the 3 to 30 GHz microwave range acts as a backup to achieve the above bit-error rate and availability requirements, but at a temporarily lower data rate.

20 Claims, 12 Drawing Sheets

-24.000 ns   1.000 ns   26.000 ns
5.00 ns/div   Real time
2   200 mV/

RECEIVER SIGNAL FROM BERT 200 Ms/e

FIG. 3

-4.000 ns   1.000 ns   6.000 ns
1.00 ns/div   Real time
2   500 mV/

RECEIVER SIGNAL OF 1.25 Gbits/s FROM BERT

POINT-TO-POINT, MILLIMETER WAVE, DUAL BAND FREE SPACE GIGABIT PER SECOND COMMUNICATION LINK

The present invention relates to wireless communications links and specifically to high data rate point-to-point links.

BACKGROUND OF THE INVENTION

Wireless Communication Point-to-Point and Point-to-Multi-Point

Wireless communications links, using portions of the electromagnetic spectrum, are well known. Most such wireless communication at least in terms of data transmitted is one way, point to multi-point, which includes commercial radio and television. However there are many examples of point-to-point wireless communication. Mobile telephone systems that have recently become very popular are examples of low-data-rate, point-to-point communication. Microwave transmitters on telephone system trunk lines are another example of prior art, point-to-point wireless communication at much higher data rates. The prior art includes a few examples of point-to-point laser communication at infrared and visible wavelengths.

Need for High Volume Information Transmission

The need for faster (i, e., higher volume per unit time) information transmission is growing rapidly. Today and into the foreseeable future transmission of information is and will be digital with volume measured in bits per second. To transmit a typical telephone conversation digitally utilizes 5,000 bits per second (5 Kbits per second). Typical personal computer modems connected to the Internet operate at, for example, 56 Kbits per second. Music can be transmitted point to point in real time with good quality using mp3 technology at digital data rates of 64 Kbits per second. Video can be transmitted in real time at data rates of about 5 Mbits per second. Broadcast quality video is typically at 45 or 90 Mbps. Companies (such as telephone and cable companies) providing point-to-point communication services build trunk lines to serve as parts of communication links for their point-to-point customers. These trunk lines typically carry hundreds or thousands of messages simultaneously using multiplexing techniques. Thus, high volume trunk lines must be able to transmit in the gigabit range (billions of bits per second). Most modem trunk lines utilize fiber optic lines. A typical fiber optic line can carry about 2 to 10 Gbits per second and many separate fibers can be included in a trunk line so that fiber optic trunk lines can be designed and constructed to carry any volume of information desired virtually without limit. However, the construction of fiber optic trunk lines is expensive (sometimes very expensive) and the design and the construction of these lines can often take many months especially if the route is over private property or produces environmental controversy. Often the expected revenue from the potential users of a particular trunk line under consideration does not justify the cost of the fiber optic trunk line. Digital microwave communication has been available since the mid-1970's. Service in the 18–23 GHz radio spectrum is called "short-haul microwave" providing point-to-point service operating between 2 and 7 miles and supporting between four to eight T1 links (each at 1.544 Mbps).

Data Rate vs Frequency

Bandwidth-efficient modulation schemes allow, as a general rule, transmission of data at rates of 1 to 10 bits per Hz of available bandwidth in spectral ranges including radio wave lengths to microwave wavelengths. Data transmission requirements of 1 to tens of Gbps thus require hundreds of MHz of available bandwidth for transmission. Equitable sharing of the frequency spectrum between radio, television, telephone, emergency services, military and other services typically limits specific frequency band allocations to about 10% fractional bandwidth (i.e., range of frequencies equal to about 10% of center frequency). AM radio, at almost 100% fractional bandwidth (550 to 1650 GHz) is an anomaly; FM radio, at 20% fractional bandwidth, is also atypical compared to more recent frequency allocations, which rarely exceed 10% fractional bandwidth.

Reliability Requirements

Reliability typically required for wireless data transmission is very high, consistent with that required for hardwired links including fiber optics. Typical requirements are error rates of less than one bit in ten billion ($10^{-10}$ bit-error rates), and link availability of 99.999% (5 minutes of down time per year). This necessitates all-weather link operability, in fog and snow, and at rain rates up to 100 mm/hour in many areas.

Weather Conditions

In conjunction with these availability requirements, weather-related attenuation limits the useful range of wireless data transmission at all wavelengths shorter than the very long radio waves. Typical ranges in a heavy rainstorm for optical links (i.e., laser communication links) are 100 meters and for microwave links, 10,000 meters.

Atmospheric attenuation of electromagnetic radiation increases generally with frequency in the microwave and millimeter-wave bands. However, excitation of rotational transitions in oxygen and water vapor molecules absorbs radiation preferentially in bands near 60 and 118 GHz (oxygen) and near 23 and 183 GHz (water vapor). Rain, which attenuates through large-angle scattering, increases monotonically with frequency from 3 to nearly 200 GHz. At the higher, millimeter-wave frequencies, (i.e., 30 GHz to 300 GHz corresponding to wavelengths of 1.0 millimeter to 1.0 centimeter) where available bandwidth is highest, rain attenuation in very bad weather limits reliable wireless link performance to distances of 1 mile or less. At microwave frequencies near and below 10 GHz, link distances to 10 miles can be achieved even in heavy rain with high reliability, but the available bandwidth is much lower.

What is needed is a wireless data link that can provide data rates in excess of 1 Gbps over distances up to ten miles in all weather conditions except the most severe, and which link will not go down or deliver corrupted data even in the most severe weather conditions.

SUMMARY OF THE INVENTION

The present invention provides a point-to-point, wireless, millimeter wave communications link providing data transmission rates of over 1 billion bits per second (more than 1 Gbps) at ranges of several miles during normal weather conditions. In a preferred embodiment a communication link operates within the 92 to 95 GHz portion of the millimeter spectrum. A first transceiver transmits at a first bandwidth and receives at a second bandwidth both within the above spectral range. A second transceiver transmits at the second bandwidth and receives at the first bandwidth. The transceivers are equipped with antennas providing divergence of less than $10^{-4}$ steradians so that an almost unlimited number of transceivers can use the same spectrum. In a preferred embodiment the first and second spectral ranges are 92.3–93.2 GHz and 94.1–95.0 GHz. During very bad weather conditions this data link will not provide a $10^{-10}$ bit-error rate and 99.999% availability. Therefore, a second transceiver pair operating in the 3 to 30 GHz microwave range acts as a backup to achieve the above bit-error rate and availability requirements, but at a temporarily lower data rate. In this embodiment a network management system, interfacing the link with the network switching and routing hardware, continually senses the performance of the high data rate channel and switches to the low data rate channel when the performance of the high data rate channel falls below a set threshold.

BRIEF DESCRIPTION OF THE DRAWINGS

FIGS. 5A, 5B1 and 5B2 are schematic diagrams of a millimeter-wave transmitter and receiver in one transceiver of a preferred embodiment of the present invention.

FIGS. 6A, 6B1 and 6B2 are schematic diagrams of a millimeter-wave transmitter and receiver in a complementary transceiver of a preferred embodiment of the present invention.

DETAILED DESCRIPTION OF PREFERRED EMBODIMENTS

Prototype Demonstration

A prototype demonstration of the millimeter-wave transmitter and receiver useful for the present invention is described by reference to FIGS. 1 to 4. With this embodiment the Applicants have demonstrated digital data transmission in the 93 to 97 GHz range at 1.25 Gbps with a bit error rate below than $10^{-12}$.

Figure 1:
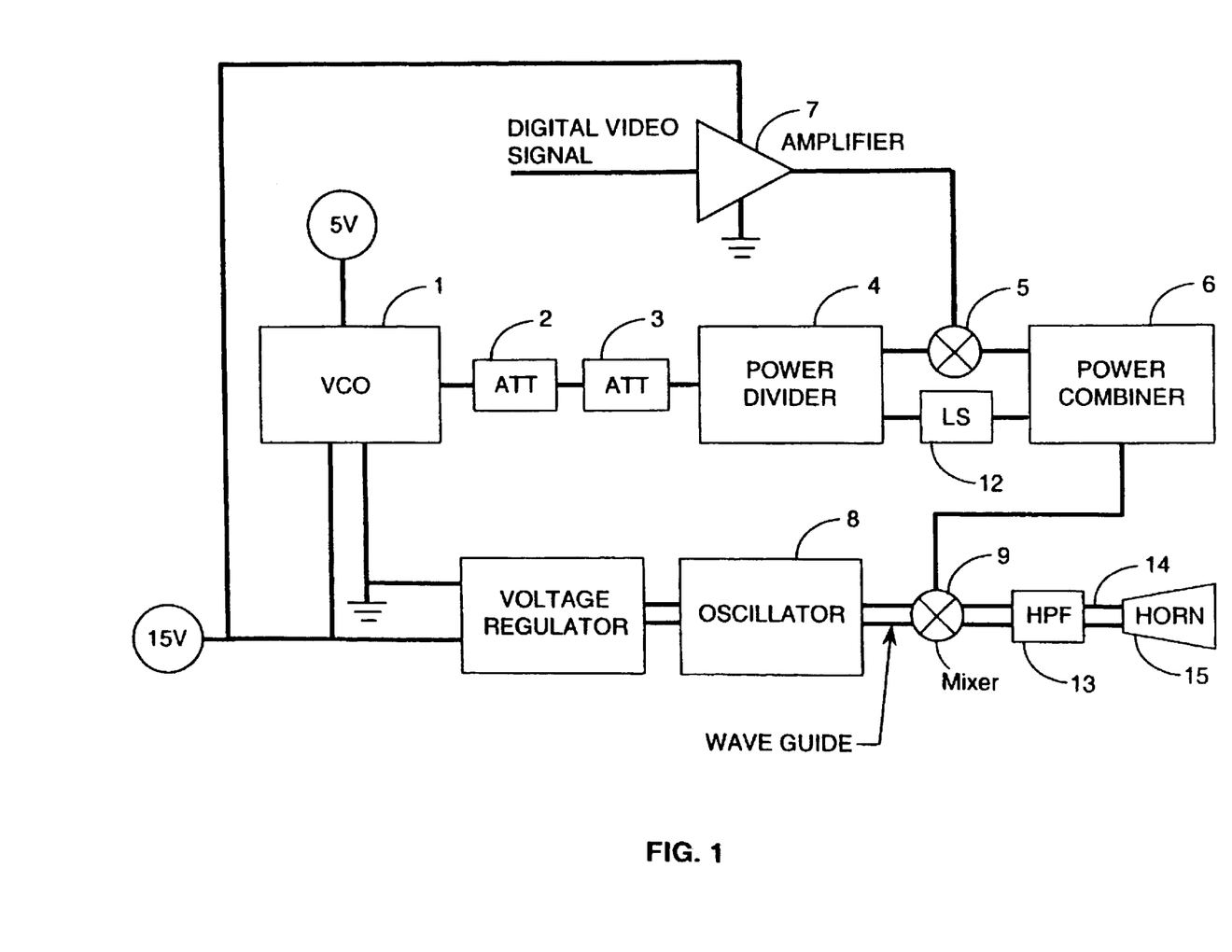
FIG. 1 is a schematic diagram of a millimeter-wave transmitter of a prototype transceiver system built and tested by Applicants.

The circuit diagram for the millimeter-wave transmitter is shown in FIG. 1. Voltage-controlled microwave oscillator 1, Westec Model VTS133/Nv4, is tuned to transmit at 10 GHz, attenuated by 16 dB with coaxial attenuators 2 and 3, and divided into two channels in two-way power divider 4. A digital modulation signal is pre-amplified in amplifier 7, and mixed with the microwave source power in triple-balanced mixer 5, Pacific Microwave Model M3001HA. The modulated source power is combined with the un-modulated source power through a two-way power combiner 6. A line stretcher 12 in the path of the un-modulated source power controls the depth of modulation of the combined output by adjusting for constructive or destructive phase summation. The amplitude-modulated 10 GHz signal is mixed with a signal from a 85-GHz source oscillator 8 in mixer 9 and high-pass filtered in waveguide filter 13 to reject the 75 GHz image band. The resultant, amplitude-modulated 95 GHz signal contains spectral components between 93 and 97 GHz, assuming unfiltered 1.25 Gbps modulation. A rectangular WR-10 wave guide output of the high pass filter is converted to a circular wave guide 14 and fed to a circular horn 15 of 4 inches diameter, where it is transmitted into free space. The horn projects a half-power beam width of 2.2 degrees.

Figure 2:
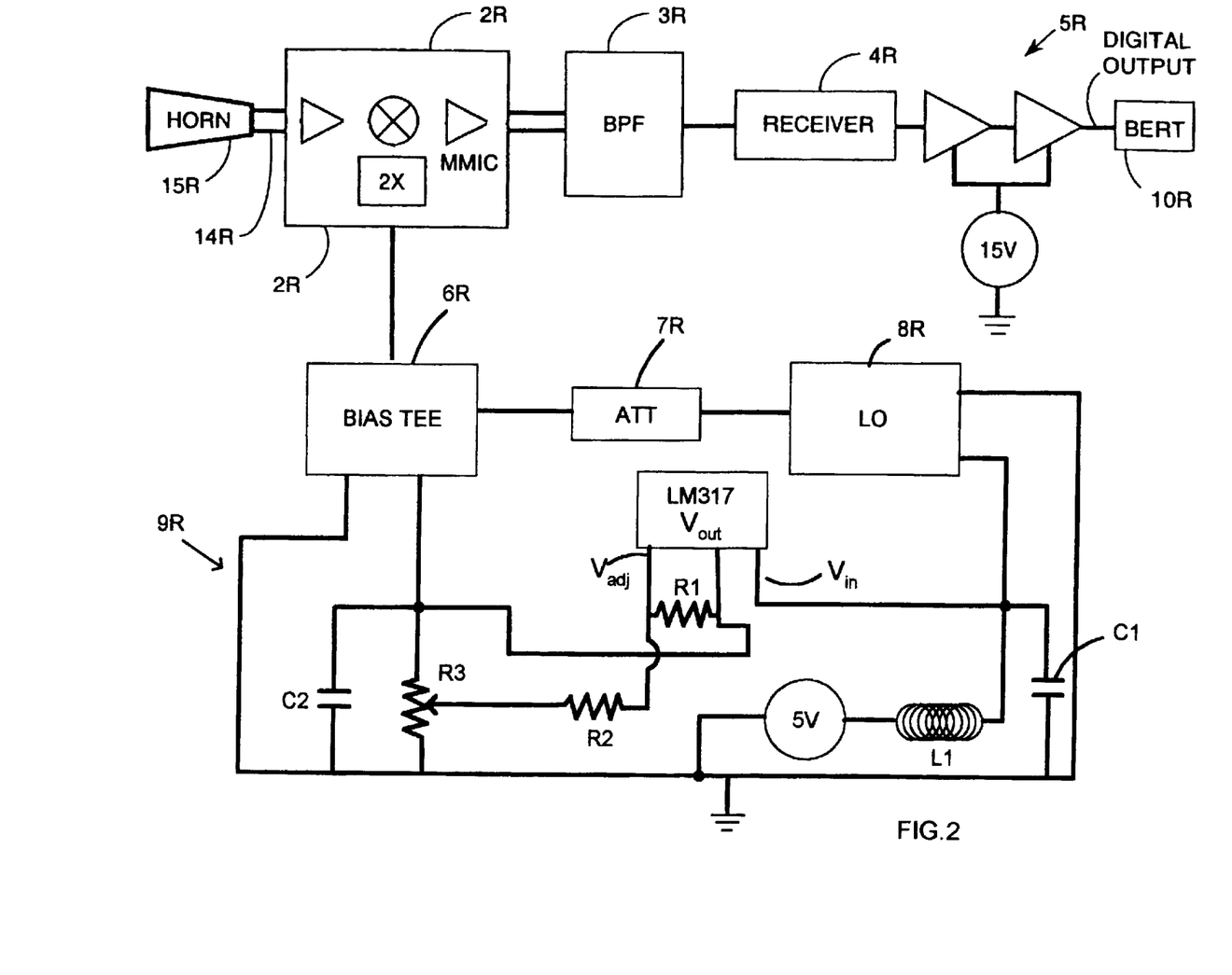
FIG. 2 is a schematic diagram of a millimeter-wave receiver of a prototype transceiver system built and tested by Applicants.

The circuit diagram for the receiver is shown in FIG. 2. The antenna is a circular horn 15R of 6 inches in diameter, fed from a waveguide unit 14R consisting of a circular W-band wave-guide and a circular-to-rectangular waveguide converter which translates the antenna feed to WR-10 wave-guide which in turn feeds heterodyne receiver module 2R. This module consists of a monolithic millimeter-wave integrated circuit (MMIC) low-noise amplifier spanning 89–99 GHz, a mixer with a two-times frequency multiplier at the LO port, and an IF amplifier covering 5–15 GHz. These receivers are available from suppliers such as Lockheed Martin. The local oscillator 8R is a cavity-tuned Gunn oscillator operating at 42.0 GHz (Spacek Model GQ410K), feeding the mixer in module R2 through a 6 dB attenuator 7. A bias tee 6R at the local oscillator input supplies DC power to receiver module 2R. A voltage regulator circuit using a National Semiconductor LM317 integrated circuit regulator supplies +3.3V through bias tee 6R. An IF output of the heterodyne receiver module 2R is filtered at 6–12 GHz using bandpass filter 3R from K&L Microwave. Receiver 4R which is an HP Herotek Model DTM 180AA diode detector, measures total received power. The voltage output from the diode detector is amplified in two-cascaded microwave amplifiers 5R from MiniCircuits, Model 2FL2000. The baseband output is carried on coax cable to a media converter for conversion to optical fiber, or to a Bit Error-Rate Tester (BERT) 10R.

Figure 3:
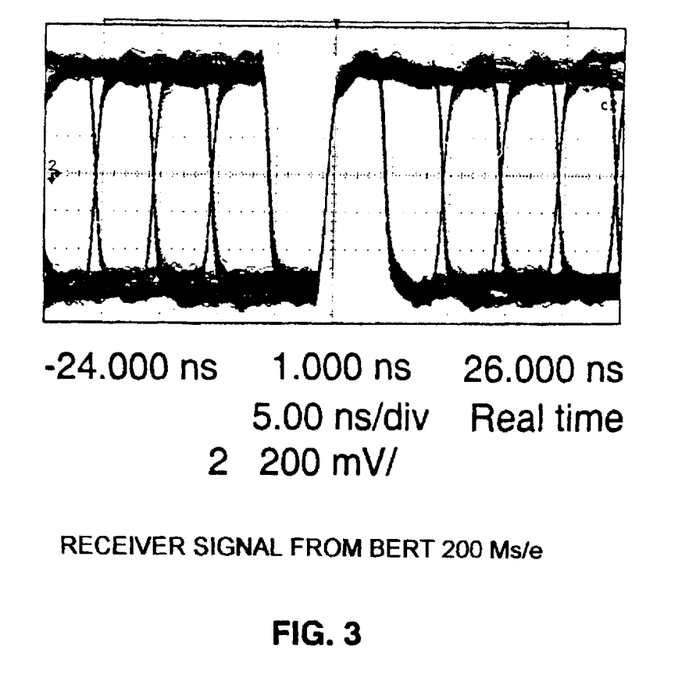
FIG. 3 is measured receiver output voltage from the prototype transceiver at a transmitted bit rate of 200 Mbps.
Figure 4:
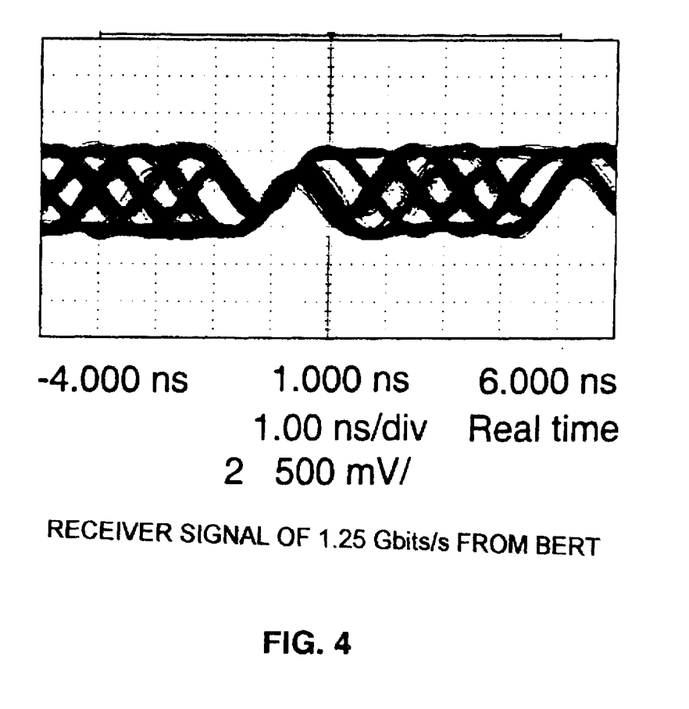
FIG. 4 is the same waveform as FIG. 3, with the bit rate increased to 1.25 Gbps.

In the laboratory, this embodiment has demonstrated a bit-error rate of less than $10^{-12}$ for digital data transmission at 1.25 Gbps. The BERT measurement unit was a Microwave Logic, Model gigaBERT. The oscilloscope signal for digital data received at 200 Mbps is shown in FIG. 3. At 1.25 Gbps, oscilloscope bandwidth limitations lead to the rounded bit edges seen in FIG. 4. Digital levels sustained for more than one bit period comprise lower fundamental frequency components (less than 312 MHz) than those which toggle each period (622 MHz), so the modulation transfer function of the oscilloscope, which falls off above 500 MHz, attenuates them less. These measurement artifacts are not reflected in the bit error-rate measurements, which yield<$10^{-12}$ bit error rate at 1.25 Gbps.

Dual-Band Transceiver System

A preferred embodiment of the present invention is described by reference to FIGS. 5 to 7. The link hardware consists of a millimeter-wave transceiver pair including a pair of millimeter-wave antennas and a microwave transceiver pair including a pair of microwave antennas. The millimeter wave transmitter signal is amplitude modulated and single-sideband filtered, and includes a reduced-level carrier. The receiver includes a heterodyne mixer, phase-locked intermediate frequency (IF) tuner, and IF power detector.

Figure 6A:
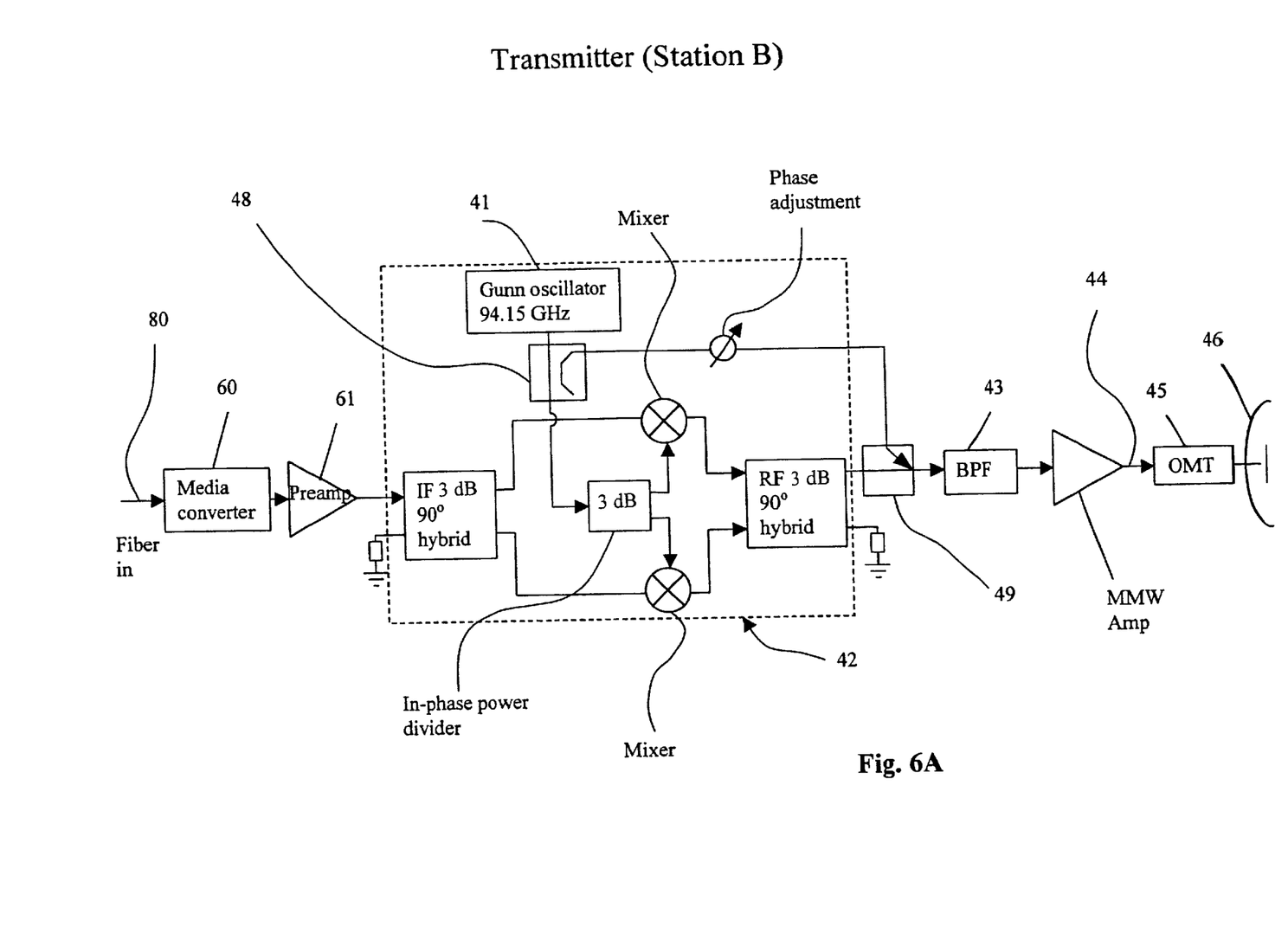
Figure 6B:
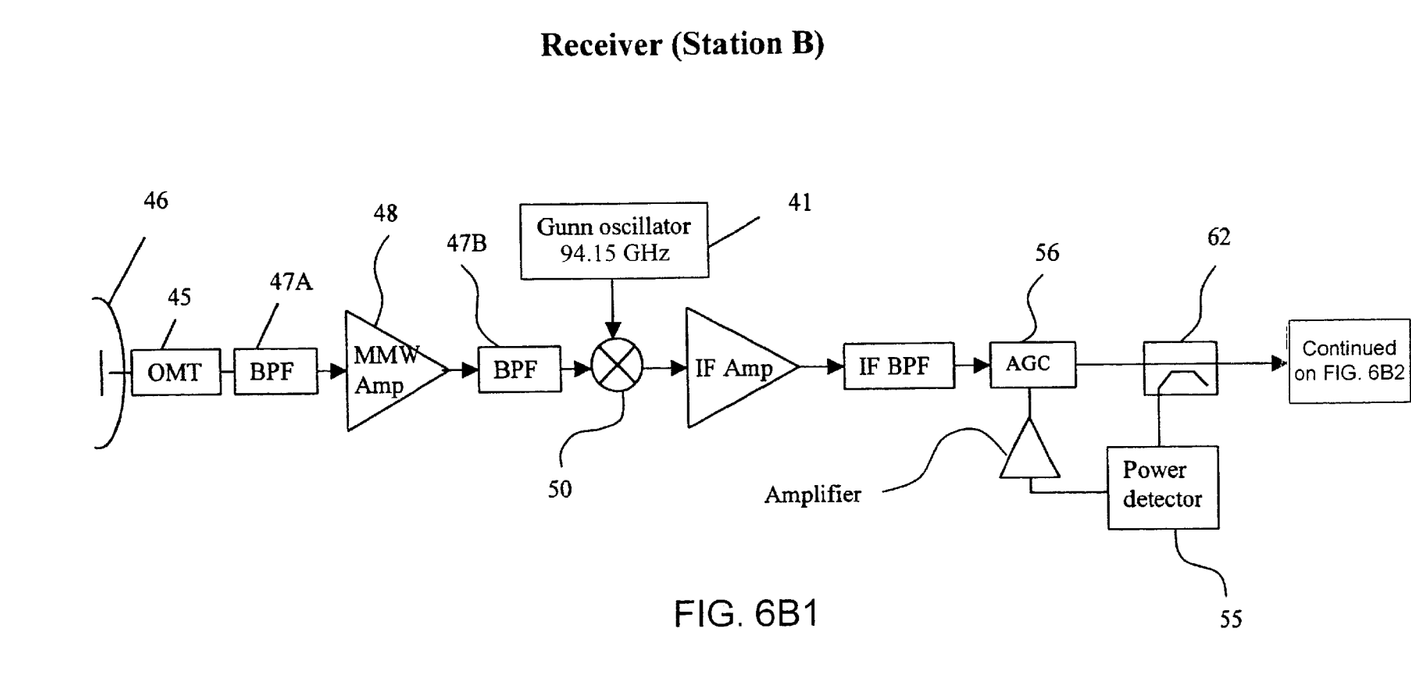
Figure 6B:
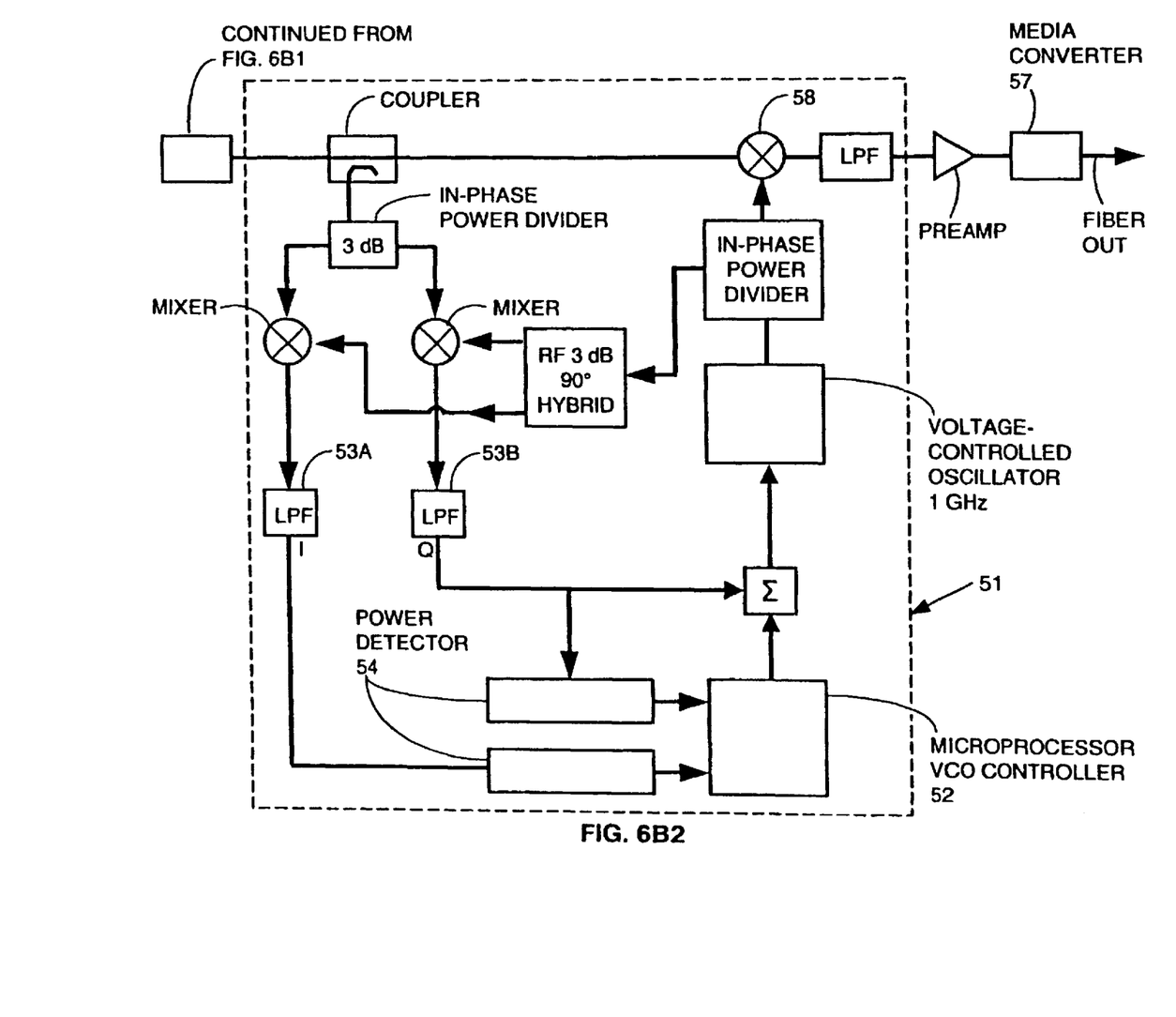
Figure 7A:
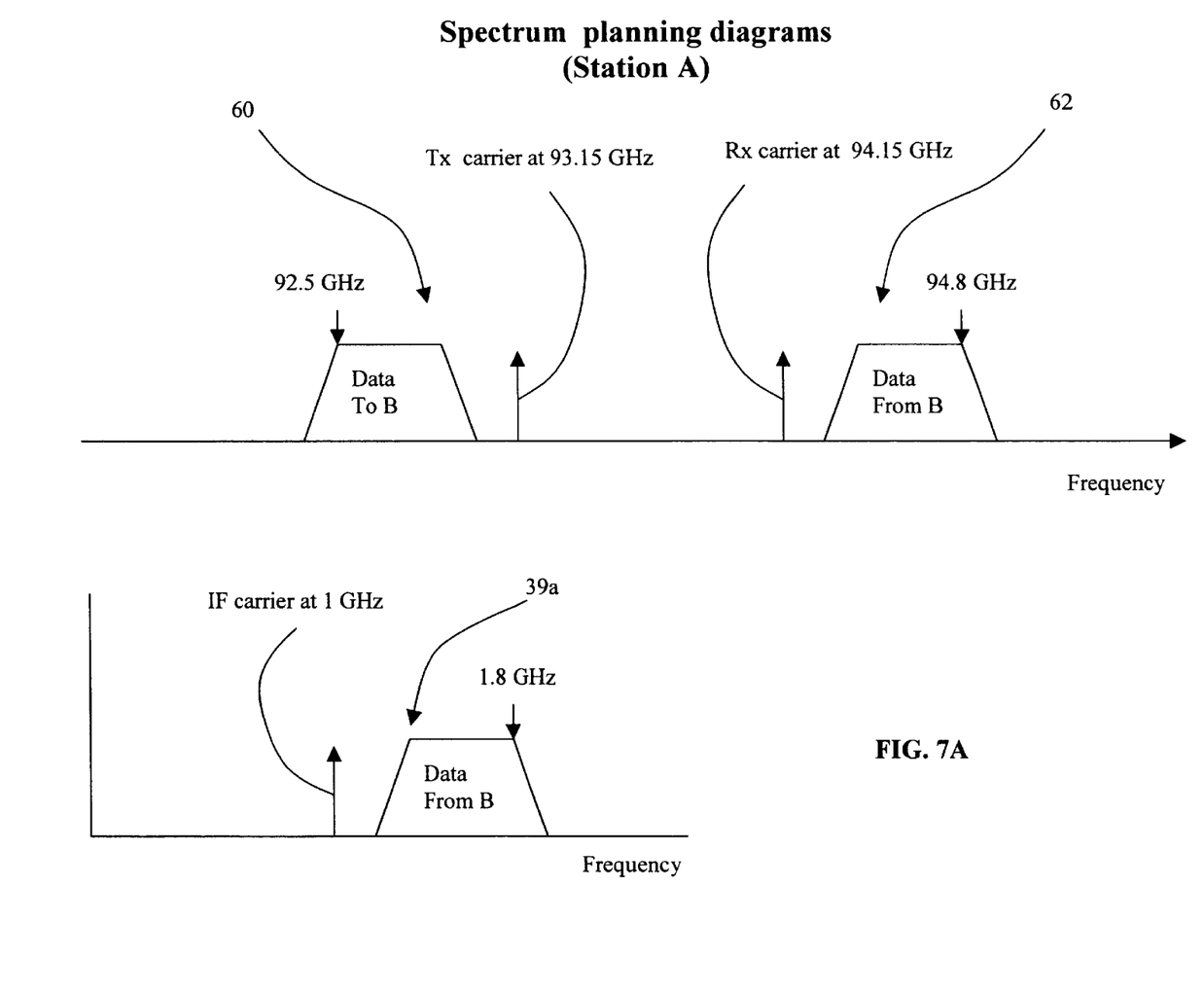
FIGS. 7A and 7B show the spectral diagrams for a preferred embodiment of the present invention.
Figure 7B:
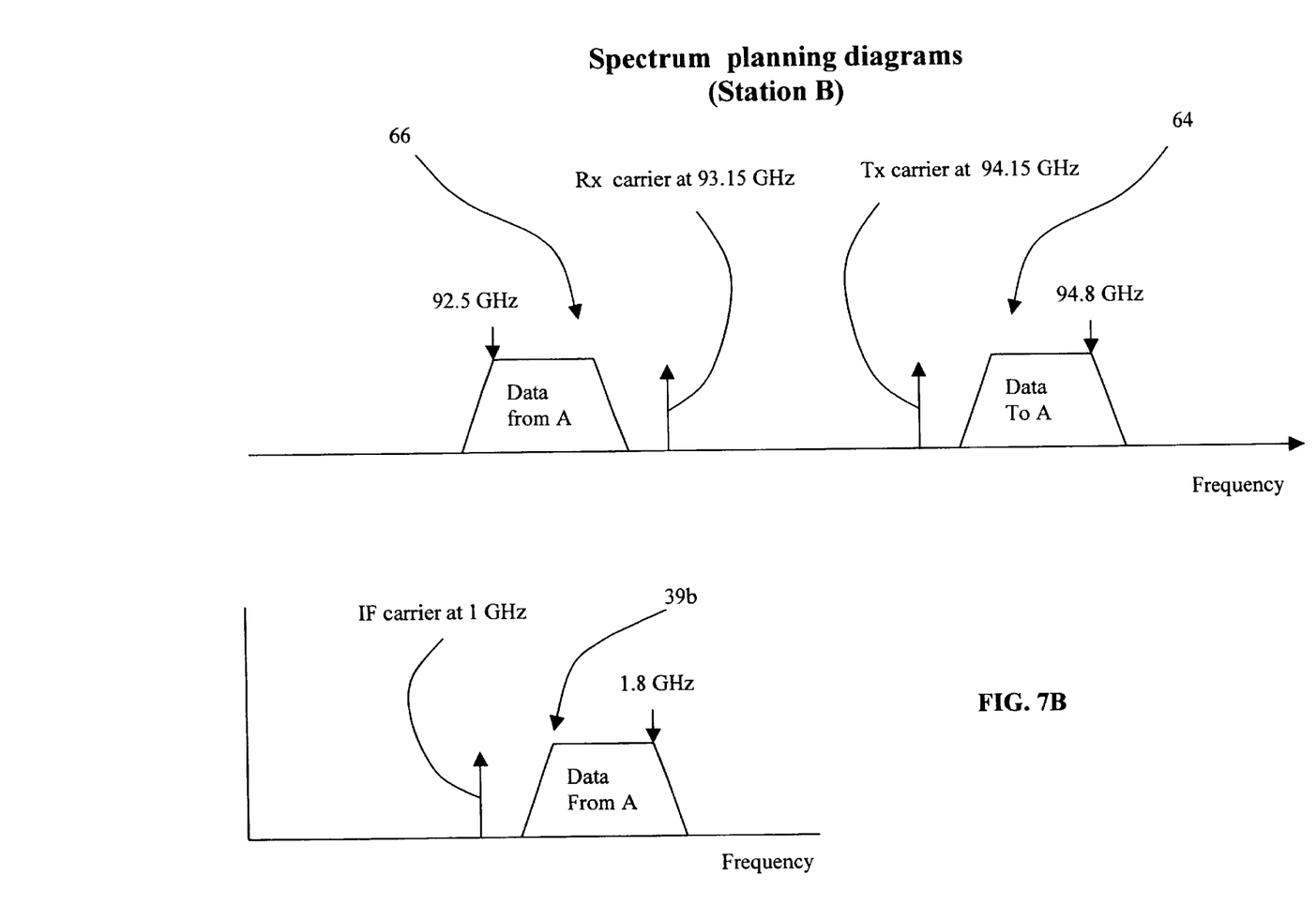

Millimeter-wave transceiver A (FIGS. 5A, 5B1, and 5B2) transmits at 92.3–93.2 GHz as shown at 60 in FIG. 7A and receives at 94.1–95.0 GHz as shown at 62, while millimeter-wave transmitter B (FIGS. 6A, 6B1, and 6B2) transmits at 94.1–95.0 GHz as shown at 64 in FIG. 7B and receives at 92.3–93.2 GHz as shown at 66.

Millimeter Wave Transceiver A

Figure 5A:
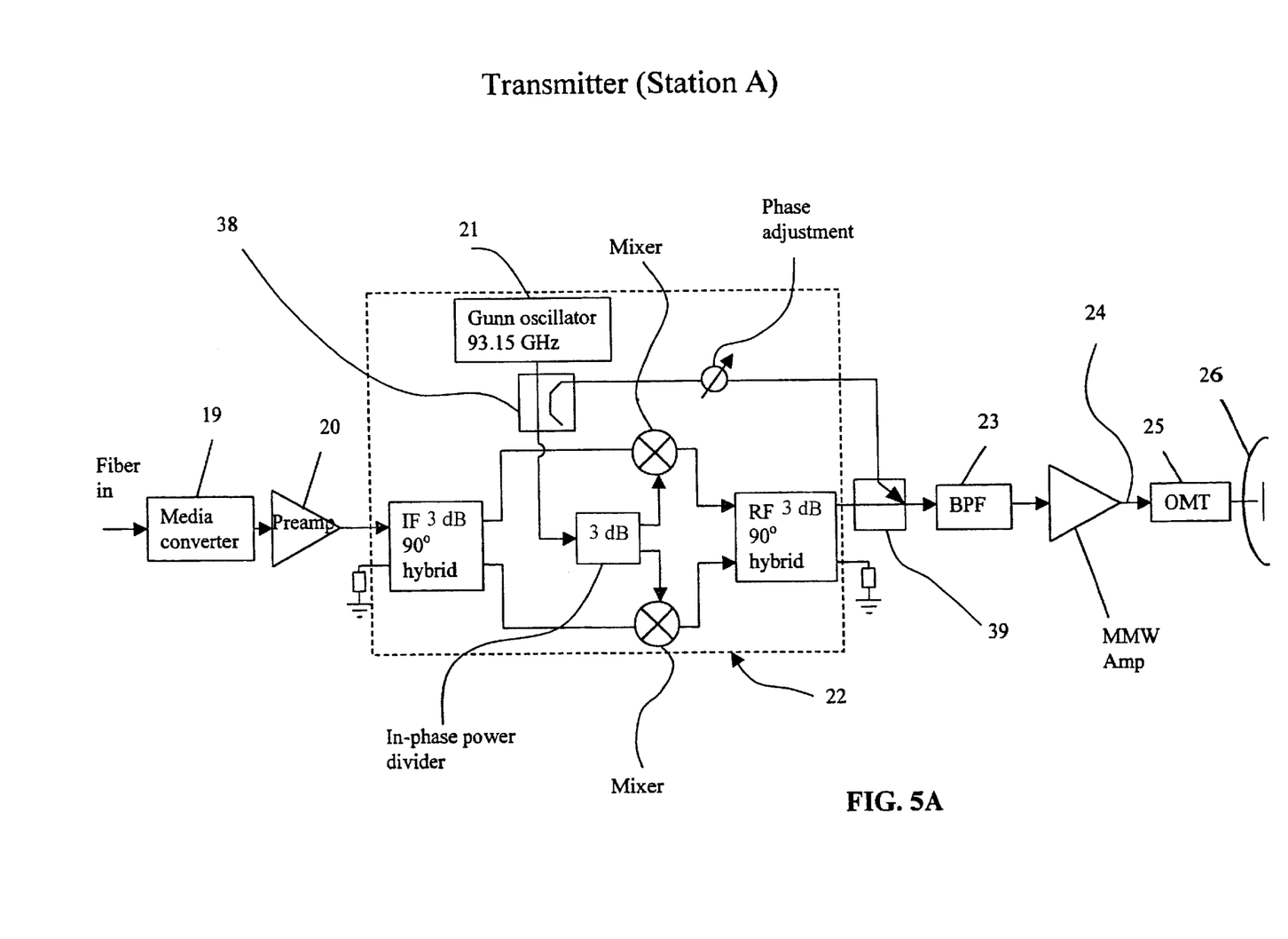
Figure 5B:
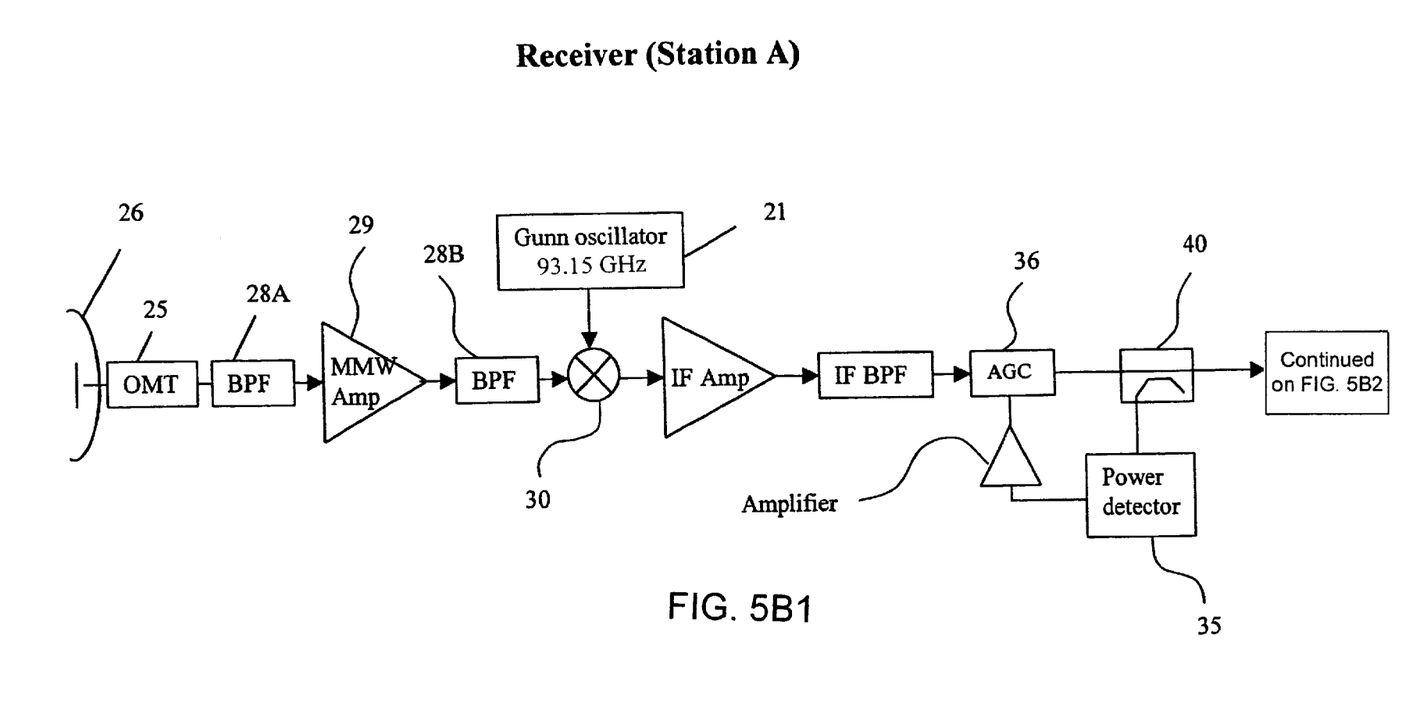
Figure 5B:
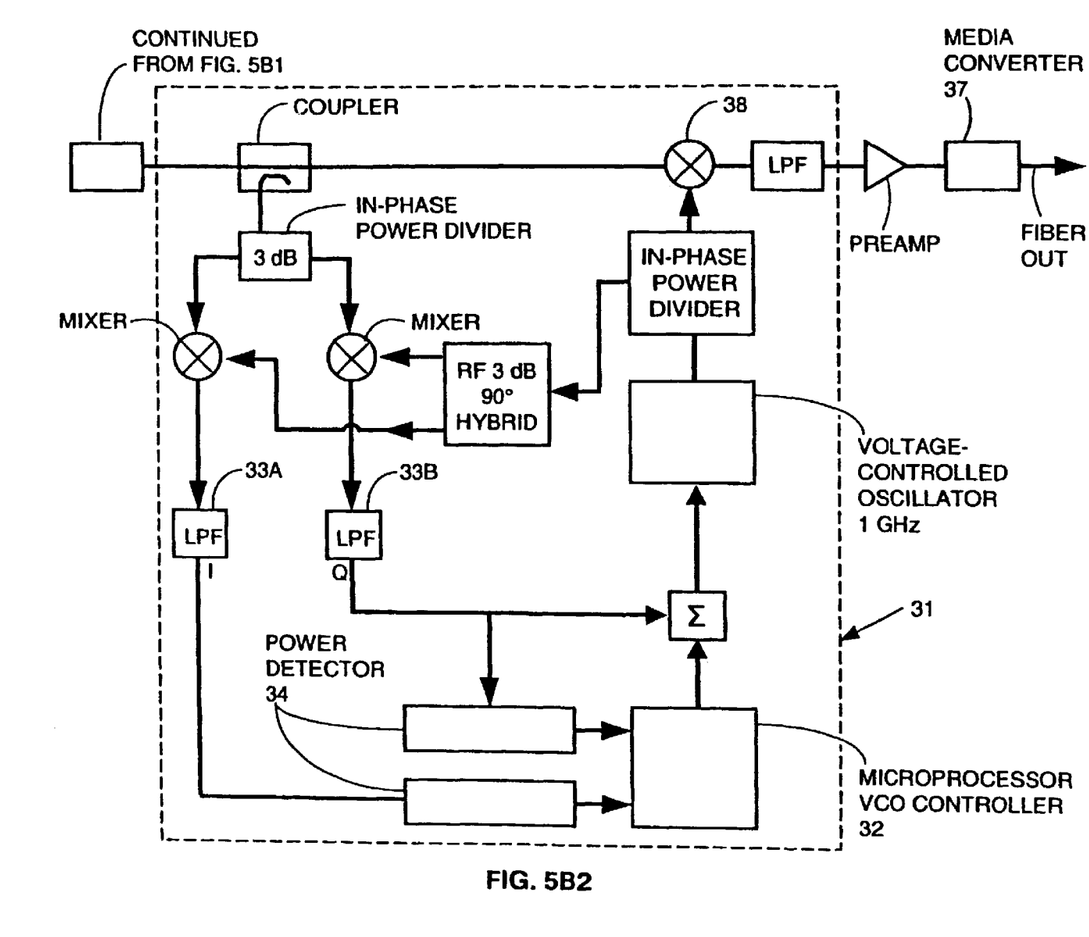

As shown in FIG. 5A in millimeter-wave transceiver A, transmit power is generated with a cavity-tuned Gunn diode 21 resonating at 93.15 GHz. This power is amplitude modulated using two balanced mixers in an image reject configuration 22, selecting the lower sideband only. The source 21 is modulated at 1.25 Gbps in conjunction with Gigabit-Ethernet standards. The modulating signal is brought in on optical fiber, converted to an electrical signal in media converter 19 (which in this case is an Agilent model HFCT-5912E) and amplified in preamplifier 20. The amplitude-modulated source is filtered in a 900 MHz-wide passband between 92.3 and 93.2 GHz, using a bandpass filter 23 on microstrip. A portion of the source oscillator signal is picked off with coupler 38 and combined with the lower sideband in power combiner 39, resulting in the transmitted spectrum shown at 60 in FIG. 7A. The combined signal propagates with horizontal polarization through a waveguide 24 to one port of an orthomode transducer 25, and on to a two-foot diameter Cassegrain dish antenna 26, where it is transmitted into free space with horizontal polarization.

The receiver unit at Station A as shown on FIGS. 5B1 and 5B2 is fed from the same Cassegrain antenna 26 as is used by the transmitter, at vertical polarization (orthogonal to that of the transmitter), through the other port of the orthomode transducer 25. The received signal is pre-filtered with bandpass filter 28A in a passband from 94.1 to 95.0 GHz, to reject back scattered return from the local transmitter. The filtered signal is then amplified with a monolithic MMW integrated-circuit amplifier 29 on indium phosphide, and filtered again in the same passband with bandpass filter 28B. This twice filtered signal is mixed with the transmitter source oscillator 21 using a heterodyne mixer-down-converter 30, to an IF frequency of 1.00-1.85 GHz, giving the spectrum shown at 39A in FIG. 7A. A portion of the IF signal, picked off with coupler 40, is detected with integrating power detector 35 and fed to an automatic gain control circuit 36. The fixed-level IF output is passed to the next stage as shown in FIG. 5B2. Here a quadrature-based (I/Q) phase-locked synchronous detector circuit 31 is incorporated, locking on the carrier frequency of the remote source oscillator. The loop is controlled with a microprocessor 32 to minimize power in the "Q" channel while verifying power above a set threshold in the "I" channel. Both "I" and "Q" channels are lowpass-filtered at 200 MHz using lowpass filters 33A and 33B, and power is measured in both the "I" and "Q" channels using square-law diode detectors 34. The baseband mixer 38 output is pre-amplified and fed through a media converter 37, which modulates a laser diode source into a fiber-optic coupler for transition to optical fiber transmission media.

Transceiver B

As shown in FIG. 6A in millimeter-wave tranceiver B, transmit power is generated with a cavity-tuned Gunn diode 41 resonating at 94.15 GHz. This power is amplitude modulated using two balanced mixers in an image reject configuration 42, selecting the upper sideband only. The source 41 is modulated at 1.25 Gbps in conjunction with Gigabit-Ethernet standards. The modulating signal is brought in on optical fiber as shown at 80, converted to an electrical signal in media converter 60, and amplified in preamplifier 61. The amplitude-modulated source is filtered in a 900 MHz-wide passband between 94.1 and 95.0 GHz, using a bandpass filter 43 on microstrip. A portion of the source oscillator signal is picked off with coupler 48 and combined with the hihger sideband in power combiner 49, resulting in the transmitted spectrum shown at 64 in FIG. 7B. The combined signal propagates with vertical polarization through a waveguide 44 to one port of an orthomode transducer 45, and on to a Cassegrain dish antenna 46, where it is transmitted into free space with vertical polarization.

The receiver is fed from the same Cassegrain antenna 46 FIG. 6B1 as the transmitter, at horizontal polarization (orthogonal to that of the transmitter), through the other port of the orthomode transducer 45. The received signal is filtered with bandpass filter 47A in a passband from 92.3 to 93.2 GHz, to reject backscattered return from the local transmitter. The filtered signal is then amplified with a monolithic MMW integrated-circuit amplifier on indium phosphide 48, and filtered again in the same passband with bandpass filter 47B. This twice filtered signal is mixed with the transmitter source oscillator 41 using a heterodyne mixer-downconverter 50, to an IF frequency of 1.00–1.85 GHz, giving the spectrum shown at 39B in FIG. 7B. A portion of the IF signal, picked off with coupler 62, is detected with integrating power detector 55 and fed to an automatic gain control circuit 56. The fixed-level IF output is passed to the next stage as shown on FIG. 6B2. Here a quadrature-based (I/Q) phase-locked synchronous detector circuit 51 is incorporated, locking on the carrier frequency of the remote source oscillator. The loop is controlled with a microprocessor 52 to minimize power in the "Q" channel while verifying power above a set threshold in the "I" channel. Both "I" and "Q" channels are lowpass-filtered at 200 MHz using a bandpass filters 53A and 53B, and power is measured in each channel using a square-law diode detector 54. The baseband mixer 58 output is pre-amplified and fed through a media converter 57, which modulates a laser diode source into a fiber-optic coupler for transition to optical fiber transmission media.

Very Narrow Beam Width

A dish antenna of two-foot diameter projects a half-power beam width of 0.36 degrees at 94 GHz. The full-power beamwidth (to first nulls in antenna pattern) is narrower than 0.9 degrees. This suggests that up to 400 independent beams could be projected azimuthally around an equator from a single transmitter location, without mutual interference, from an array of 2-foot dishes. At a distance of ten miles, two receivers placed 800 feet apart can receive independent data channels from the same transmitter location. Conversely, two receivers in a single location can discriminate independent data channels from two transmitters ten miles away, even when the transmitters are as close as 800 feet apart. Larger dishes can be used for even more directivity.

Backup Microwave Transceiver Pair

During severe weather conditions data transmission quality will deteriorate at millimeter wave frequencies. Therefore, in preferred embodiments of the present invention a backup communication link is provided which automatically goes into action whenever a predetermined drop-off in quality transmission is detected. A preferred backup system is a microwave transceiver pair operating in the 10.7–11.7 GHz band. This frequency band is already allocated by the FCC for fixed point-to-point operation. FCC service rules parcel the band into channels of 40-MHz maximum bandwidth, limiting the maximum data rate for digital transmissions to 45 Mbps full duplex. Transceivers offering this data rate within this band are available off-the-shelf from vendors such as Western Multiplex Corporation (Models Lynx DS-3, Tsunami 100BaseT), and DMC Stratex Networks (Model DXR700 and Altium 155). The digital radios are licensed under FCC Part 101 regulations. The microwave antennas are Cassegrain dish antennas of 24-inch diameter. At this diameter, the half-power beamwidth of the dish antenna is 3.0 degrees, and the full-power beamwidth is 7.4 degrees, so the risk of interference is higher than for MMW antennas. To compensate this, the FCC allocates twelve separate transmit and twelve separate receive channels for spectrum coordination within the 10.7–11.7 GHz band.

Sensing of a millimeter wave link failure and switching to redundant microwave channel is an existing automated feature of the network routing switching hardware available off-the-shelf from vendors such as Cisco, Foundry Networks and Juniper Networks.

Narrow Beam Width Antennas

The narrow antenna beam widths afforded at millimeter-wave frequencies allow for geographical portioning of the airwaves, which is impossible at lower frequencies. This fact eliminates the need for band parceling (frequency sharing), and so enables wireless communications over a much larger bandwidth, and thus at much higher data rates, than were ever previously possible at lower RF frequencies.

The ability to manufacture and deploy antennas with beam widths narrow enough to ensure non-interference, requires mechanical tolerances, pointing accuracies, and electronic beam steering/tracking capabilities, which exceed the capabilities of the prior art in communications antennas. A preferred antenna for long-range communication at frequencies above 70 GHz has gain in excess of 50 dB, 100 times higher than direct-broadcast satellite dishes for the home, and 30 times higher than high-resolution weather radar antennas on aircraft. However, where interference is not a potential problem, antennas with dB gains of 40 to 45 may be preferred.

Most antennas used for high-gain applications utilize a large parabolic primary collector in one of a variety of geometries. The prime-focus antenna places the receiver directly at the focus of the parabola. The Cassegrainian antenna places a convex hyperboloidal secondary reflector in front of the focus to reflect the focus back through an aperture in the primary to allow mounting the receiver behind the dish. (This is convenient since the dish is typically supported from behind as well.) The Gregorian antenna is similar to the Cassegrainian antenna, except that the secondary mirror is a concave ellipsoid placed in back of the parabola's focus. An offset parabola rotates the focus away from the center of the dish for less aperture blockage and improved mounting geometry. Cassegrainian, prime focus, and offset parabolic antennas are the preferred dish geometries for the MMW communication system.

A preferred primary dish reflector is a conductive parabola. The preferred surface tolerance on the dish is about 15 thousandths of an inch (15 mils) for applications below 40 GHz, but closer to 5 mils for use at 94 GHz. Typical hydroformed aluminum dishes give 15-mil surface tolerances, although double-skinned laminates (using two aluminum layers surrounding a spacer layer) could improve this to 5 mils. The secondary reflector in the Cassegrainian geometry is a small, machined aluminum "lollipop" which can be made to 1-mil tolerance without difficulty. Mounts for secondary reflectors and receiver waveguide horns preferably comprise mechanical fine-tuning adjustment for in-situ alignment on an antenna test range.

Flat Panel Antenna

Another preferred antenna for long-range MMW communication is a flat-panel slot array antenna such as that described by one of the present inventors and others in U.S. Pat. No. 6,037,908, issued Mar. 14, 2000 which is hereby incorporated herein by reference. That antenna is a planar phased array antenna propagating a traveling wave through the radiating aperture in a transverse electromagnetic (TEM) mode. A communications antenna would comprise a variant of that antenna incorporating the planar phased array, but eliminating the frequency-scanning characteristics of the antenna in the prior art by adding a hybrid traveling-wave/ corporate feed. Flat plates holding a 5-mil surface tolerance are substantially cheaper and easier to fabricate than parabolic surfaces. Planar slot arrays utilize circuit-board processing techniques (e.g. photolithography), which are inherently very precise, rather than expensive high-precision machining.

Coarse and Fine Pointing

Pointing a high-gain antenna requires coarse and fine positioning. Coarse positioning can be accomplished initially using a visual sight such as a bore-sighted rifle scope or laser pointer. The antenna is locked in its final coarse position prior to fine-tuning. The fine adjustment is performed with the remote transmitter turned on. A power meter connected to the receiver is monitored for maximum power as the fine positioner is adjusted and locked down.

At gain levels above 50 dB, wind loading and tower or building flexure can cause an unacceptable level of beam wander. A flimsy antenna mount could not only result in loss of service to a wireless customer; it could inadvertently cause interference with other licensed beam paths. In order to maintain transmission only within a specific "pipe," some method for electronic beam steering may be required.

Beam Steering

Phased-array beam combining from several ports in the flat-panel phased array could steer the beam over many antenna beamwidths without mechanically rotating the antenna itself. Sum-and-difference phase combining in a mono-pulse receiver configuration locates and locks on the proper "pipe." In a Cassegrainian antenna, a rotating, slightly unbalanced secondary ("conical scan") could mechanically steer the beam without moving the large primary dish. For prime focus and offset parabolas, a multi-aperture (e.g., quad-cell) floating focus could be used with a selectable switching array. In these dish architectures, beam tracking is based upon maximizing signal power into the receiver. In all cases, the common aperture for the receiver and transmitter ensures that the transmitter, as well as the receiver, is correctly pointed.

Typical Installation

Figure 8:
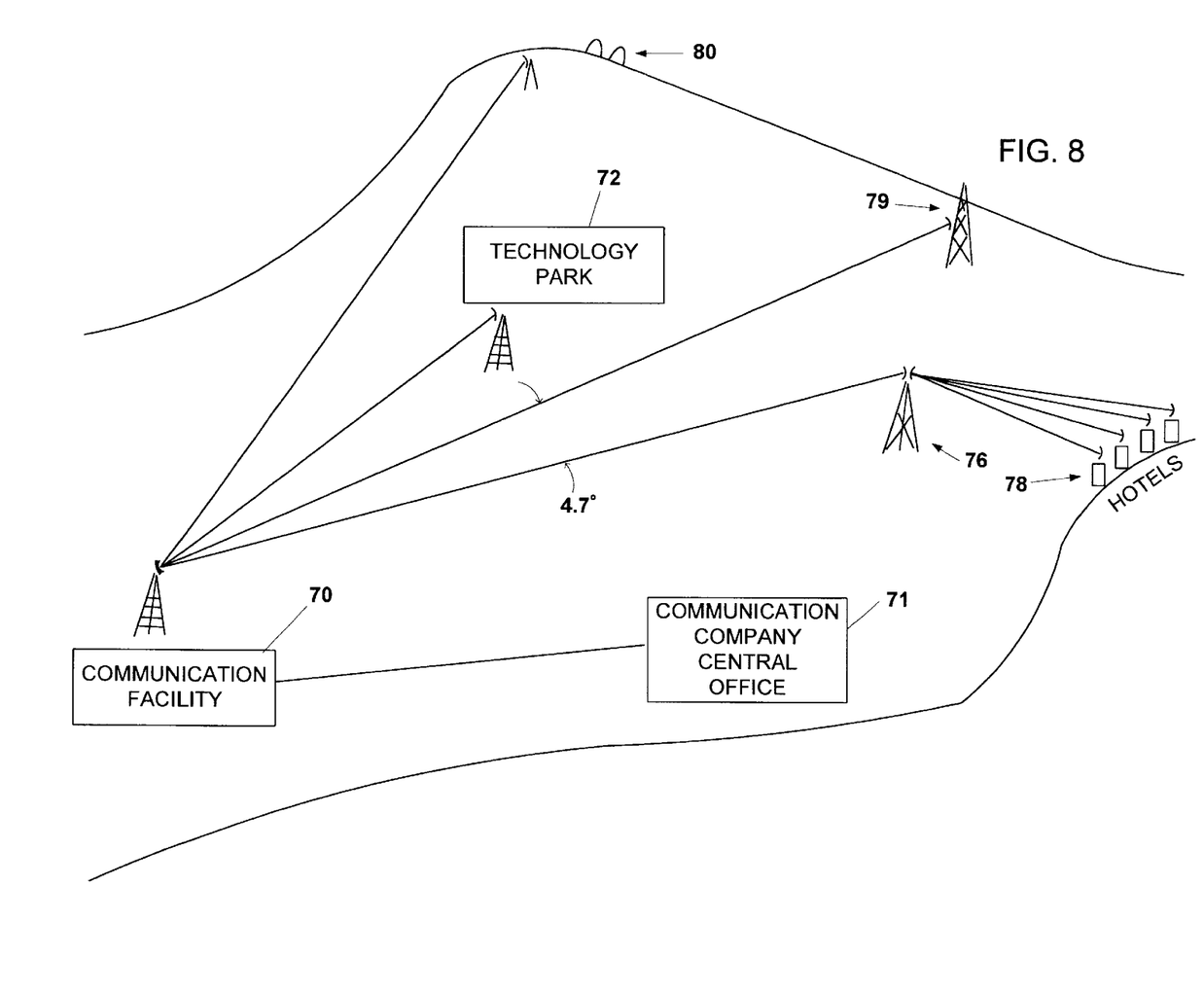
FIG. 8 is a layout showing an installation using a preferred embodiment of the present invention.

FIG. 8 is a map layout of a proposed application of the present invention. This map depicts a sparsely populated section of the island, Maui in Hawaii. Shown are communication facility 70 which is connected to a major communication trunk line from a communication company's central office 71, a technology park 72 located about 2 miles from facility 70, a relay station 76 located about 6 miles from facility 70 and four large ocean-front hotels 78 located about 3 miles from relay station 76. Also shown is a mountaintop observatory 80 located 13 miles from facility 70 and a radio antenna tower 79 located 10 miles from facility 70. As indicated in FIG. 8, the angular separation between the radio antenna and the relay station is only 4.7 degrees. Four type-A transceiver units are positioned at facility 70, each comprising a transmitter and receiver unit as described in FIGS. 5A, 5B1, and 5B2. These units are directed at corresponding type-B transceiver units positioned at the technology park, the relay station, the observatory, and the radio tower. Millimeter wave transceiver units with back-up microwave units as described above are also located at the hotels and are in communication with corresponding units at the relay station. In a preferred embodiment the 1.25 GHz spectrum is divided among the four hotels so that only one link needs to be provided between facility 70 and relay station 76. This system can be installed and operating within a period of about one month and providing the most modem communication links to these relatively isolated facilities. The cost of the system is a very small fraction of the cost of providing fiber optic links offering similar service.

The microwave backup links operate at approximately eight times lower frequency (8 times longer wavelength) than the millimeter wave link. Thus, at a given size, the microwave antennas have broader beam widths than the millimeter-wave antennas, again wider by about 8 times. A typical beam width from a 2-foot antenna is about 7.5 degrees. This angle is wider than the angular separation of four service customers (hotels) from the relay tower and it is wider than the angular separation of the beam between the relay station and the radio antenna. Specifically, the minimum angular separation between hotels from the relay station is 1.9 degrees. The angular separation between receivers at radio antenna tower 79 and relay station 76 is 4.7 degrees as seen from a transmitter at facility 70. Thus, these microwave beams cannot be separated spatially; however, the FCC Part 101 licensing rules mandate the use of twelve separate transmit and twelve separate receive channels within the microwave 10.7 to 11.7 GHz band, so these microwave beams can be separated spectrally. Thus, the FCC sponsored frequency coordination between the links to individual hotels and between the links to the relay station and the radio antenna will guarantee non-interference, but at a much reduced data rate. The FCC has appointed a Band Manager, who oversees the combined spatial and frequency coordination during the licensing process.

Other Embodiments

Any millimeter-wave carrier frequency consistent with U.S. Federal Communications Commission spectrum allocations and service rules, including MMW bands currently allocated for fixed point-to-point services at 71–76 GHz, 81–86 GHz, and 92–100 GHz, can be utilized in the practice of this invention. Likewise any of the several currently-allocated microwave bands, including 5.9–16.9 GHz, 10.7–11.7 GHz, 17.7–19.7 GHz, and 21.2–23.6 GHz can be utilized for the backup link. The modulation bandwidth of both the MMW and microwave channels can be increased, limited again only by FCC spectrum allocations. Also, any flat, conformal, or shaped antenna capable of transmitting the modulated carrier over the link distance in a means consistent with FCC emissions regulations can be used. Horns, prime focus and offset parabolic dishes, and planar slot arrays are all included.

Transmit power may be generated with a Gunn diode source, an injection-locked amplifier or a MMW tube source resonating at the chosen carrier frequency or at any sub-harmonic of that frequency. Source power can be amplitude, frequency or phase modulated using a PIN switch, a mixer or a biphase or continuous phase modulator. Modulation can take the form of simple bi-state AM modulation, or can involve more than two symbol states, e.g., using quantized amplitude modulation (QAM). Double-sideband (DSB), single-sideband (SSB) or vestigial sideband (VSB) techniques can be used to pass, suppress or reduce one AM sideband and thereby affect bandwidth efficiency. Phase or frequency modulation schemes can also be used, including simple FM, bi-phase, or quadrature phase-shift keying (QPSK). Transmission with a full or suppressed carrier can be used. Digital source modulation can be performed at any date rate in bits per second up to eight times the modulation bandwidth in Hertz, using suitable symbol transmission schemes. Analog modulation can also be performed. A monolithic or discrete-component power amplifier can be incorporated after the modulator to boost the output power. Linear or circular polarization can be used in any combination with carrier frequencies to provide polarization and frequency diversity between transmitter and receiver channels. A pair of dishes can be used instead of a single dish to provide spatial diversity in a single transceiver as well.

The MMW Gunn diode and MMW amplifier can be made on indium phosphide, gallium arsenide, or metamorphic InP-on-GaAs. The MMW amplifier can be eliminated completely for short-range links. The detector can be made using silicon or gallium arsenide. The mixer/downconverter can be made on a monolithic integrated circuit or fabricated from discrete mixer diodes on doped silicon, gallium arsenide, or indium phosphide. The phase lock loop can use a microprocessor-controlled quadrature (I/Q) comparator or a scanning filter. The detector can be fabricated on silicon or gallium arsenide, or can comprise a heterostructure diode using indium antimonide.

The backup transceivers can use alternate bands 5.9–6.9 GHz, 17.7–19.7 GHz, or 21.2–23.6 GHz; all of which are covered under FCC Part 101 licensing regulations. The antennas can be Cassegrainian, offset or prime focus dishes, or flat panel slot array antennas, of any size appropriate to achieve suitable gain.

While the above description contains many specifications, the reader should not construe these as a limitation on the scope of the invention, but merely as exemplifications of preferred embodiments thereof. For example, the full allocated MMW band referred to in the description of the preferred embodiment described in detail above along with state of the art modulation schemes may permit transmittal of data at rates exceeding 10 Gbits per second. Such data rates would permit links compatible with 10-Gigabit Ethernet, a standard that is expected to become practical within the next two years. The present invention is especially useful in those locations where fiber optics communication is available and the distances between communications sites are less than about 15 miles but longer than the distances that could be reasonably served with free space laser communication devices. Ranges of about 1 mile to about 10 miles are ideal for the application of the present invention. However, in regions with mostly clear weather the system could provide good service to distances of 20 miles or more. Accordingly the reader is requested to determine the scope of the invention by the appended claims and their legal equivalents, and not by the examples given above.

What is claimed is:

1. A point-to-point dual band gigabit millimeter wave communications system comprising:
   A) a first millimeter wave transceiver system located at a first site capable of transmitting and receiving to and from a second site through atmosphere digital information at rates in excess of 1 billion bits per second during normal weather conditions,
   B) a second millimeter wave transceiver system located at said second site capable of transmitting and receiving digital information to and from said first site at rates in excess of 1 billion bits per second during normal weather conditions, and C) a back-up transceiver system operating at a data transmittal rate of much less than 1 billion bits per second configured to continue transmittal of information between said first and second sites in the event of abnormal weather conditions.

2. A system as in claim 1 wherein one of said first and second transceiver systems is configured to transmit at frequencies in the range of about 92.3 to 93.2 GHz and to receive information at frequencies in the range of about 94.1 to 95.0 GHz.

3. A system as in claim 1 wherein each of said first and said second transceiver are configured to transmit and receive information at bit error ratios of less than $10^{-10}$ during normal weather conditions.

4. A system as in claim 1 wherein both said first and said second transceiver systems are equipped with antennas providing a gain of greater than 40 dB.

5. A system as in claim 4 wherein at least one of said antennas is a prime focus parabolic antenna.

6. A system as in claim 4 wherein at least one of said antennas is an offset parabolic antenna.

7. A system as in claim 4 wherein at least one of said antennas is a Cassegrainian antenna.

8. A system as in claim 4 wherein at least one of said antennas is a flat panel antenna.

9. A system as in claim 1 wherein both said first and said second transceiver systems are equipped with antennas providing a gain of greater than 45 dB.

10. A system as in claim 1 wherein both said first and said second transceiver systems are equipped with antennas providing a gain of greater than 50 dB.

11. A system as in claim 1 wherein said first transceiver system is configured to transmit and receive information at frequencies between 92 and 95 GHz.

12. A system as in claim 1 wherein said first transceiver system is configured to transmit and receive information at frequencies greater than 70 GHz.

13. A system as in claim 1 wherein said first transceiver system is configured to transmit and receive information at frequencies greater than 90 GHz.

14. A system as in claim 1 wherein said first and said second sites are separated by at least one mile.

15. A system as in claim 1 wherein said first and said second sites are separated by at least 10 miles.

16. A system as in claim 1 wherein said first and said second sites are separated by at least 7 miles.

17. A system as in claim 1 wherein said first and said second sites are separated by at least 2 miles.

18. A system as in claim 1 wherein said back-up transceiver system is a microwave system.

19. A system as in claim 18 wherein said back-up transceiver system is configured to operate in the frequency range of 10.7 to 11.7 GHz.

20. A system as in claim 18 wherein said back-up transceiver system is configured to operate in the frequency range of 5.9 to 6.9 GHz.

* * * * *